US010953995B2

(12) United States Patent
Gansler et al.

(10) Patent No.: US 10,953,995 B2
(45) Date of Patent: Mar. 23, 2021

(54) PROPULSION SYSTEM FOR AN AIRCRAFT

(71) Applicant: General Electric Company, Schenectady, NY (US)

(72) Inventors: Michael Thomas Gansler, Mason, OH (US); Robert Charles Hon, Fort Mitchell, KY (US)

(73) Assignee: General Electric Company, Schenectady, NY (US)

( * ) Notice: Subject to any disclaimer, the term of this patent is extended or adjusted under 35 U.S.C. 154(b) by 632 days.

(21) Appl. No.: 15/639,098

(22) Filed: Jun. 30, 2017

(65) Prior Publication Data
US 2019/0002113 A1 Jan. 3, 2019

(51) Int. Cl.
*B64D 27/02* (2006.01)
*B64D 27/24* (2006.01)
(Continued)

(52) U.S. Cl.
CPC ............ *B64D 27/24* (2013.01); *B64D 27/02* (2013.01); *B64D 27/12* (2013.01); *B64D 31/00* (2013.01); *B64D 31/06* (2013.01); *B64D 35/08* (2013.01); *F01D 15/10* (2013.01); *B60K 6/22* (2013.01); *B60L 50/16* (2019.02); *B60L 2200/10* (2013.01); *B60W 2710/0677* (2013.01); *B64D 2027/026* (2013.01); *F05D 2220/323* (2013.01);
(Continued)

(58) Field of Classification Search
CPC ............................................. B64D 2027/026
See application file for complete search history.

(56) References Cited

U.S. PATENT DOCUMENTS 4,792,906 A  12/1988 King et al.
5,090,193 A   2/1992 Schwarz et al.
(Continued)

FOREIGN PATENT DOCUMENTS

DE  102013209388 A1  11/2014
DE  112015001403 T5   12/2016
(Continued)

OTHER PUBLICATIONS

European Search Report Corresponding to EP Application 18179740 dated Sep. 14, 2018.
(Continued)

*Primary Examiner* — Brian M O'Hara
(74) *Attorney, Agent, or Firm* — Dority & Manning, P.A.

(57) ABSTRACT

A hybrid-electric propulsion system includes a turbomachine and an electrical system, the electrical system including an electric machine coupled to the turbomachine. A method for operating the propulsion system includes receiving, by one or more computing devices, a command to accelerate the turbomachine to provide a desired thrust output; receiving, by the one or more computing devices, data indicative of a temperature parameter approaching or exceeding an upper threshold; and providing, by the one or more computing devices, electrical power to the electric machine to add power to the turbomachine to provide, or assist with providing, the desired thrust output in response to receiving the command to accelerate the turbomachine and receiving the data indicative of the temperature parameter approaching or exceeding the upper threshold.

16 Claims, 7 Drawing Sheets

(51) Int. Cl.
*B64D 31/06* (2006.01)
*B64D 27/12* (2006.01)
*B64D 31/00* (2006.01)
*B64D 35/08* (2006.01)
*F01D 15/10* (2006.01)
*B60L 50/16* (2019.01)
*B60K 6/22* (2007.10)

(52) U.S. Cl.
CPC .... *F05D 2220/74* (2013.01); *F05D 2270/051* (2013.01); *F05D 2270/303* (2013.01); *F05D 2270/3032* (2013.01)

(56) References Cited

U.S. PATENT DOCUMENTS

| | | | |
|---|---|---|---|
| 5,325,042 A | 6/1994 | Murugan | |
| 5,574,647 A | 11/1996 | Liden | |
| 5,878,566 A * | 3/1999 | Endo | F23N 5/003 |
| | | | 60/773 |
| 6,474,603 B1 | 11/2002 | Kinkead et al. | |
| 6,979,979 B2 | 12/2005 | Xu et al. | |
| 7,328,577 B2 | 2/2008 | Stewart et al. | |
| 7,546,741 B2 * | 6/2009 | Sasao | F23N 5/003 |
| | | | 60/778 |
| 7,690,205 B2 | 4/2010 | Delaloye et al. | |
| 8,010,250 B2 | 8/2011 | Borumand et al. | |
| 8,311,687 B2 | 11/2012 | Bakker | |
| 8,615,335 B2 | 12/2013 | Couey et al. | |
| 8,645,009 B2 | 2/2014 | Klooster | |
| 8,713,946 B2 | 5/2014 | Botarelli | |
| 8,904,972 B2 | 12/2014 | Kumar et al. | |
| 9,008,942 B2 * | 4/2015 | Dyrla | B64C 27/14 |
| | | | 701/99 |
| 9,051,881 B2 | 6/2015 | Bettner | |
| 9,140,195 B2 | 9/2015 | Botarelli | |
| 9,146,545 B2 | 9/2015 | Stewart | |
| 9,157,372 B2 | 10/2015 | Sowden | |
| 9,200,591 B2 | 12/2015 | Du et al. | |
| 9,209,721 B2 | 12/2015 | Solodovnik et al. | |
| 9,428,267 B2 | 8/2016 | DeVita et al. | |
| 9,429,078 B1 | 8/2016 | Crowe et al. | |
| 9,488,109 B2 | 11/2016 | Sowden | |
| 9,564,056 B1 | 2/2017 | Ghaemi et al. | |
| 10,377,501 B2 * | 8/2019 | Connaulte | B64D 35/08 |
| 2008/0276620 A1 * | 11/2008 | Ullyott | F01D 21/06 |
| | | | 60/773 |
| 2009/0048730 A1 * | 2/2009 | Akkaram | G07C 5/006 |
| | | | 701/31.4 |
| 2012/0209456 A1 | 8/2012 | Harmon et al. | |
| 2013/0233977 A1 | 9/2013 | Smiley et al. | |
| 2015/0100181 A1 | 4/2015 | Strauss et al. | |
| 2015/0142216 A1 | 5/2015 | Tillman et al. | |
| 2015/0285165 A1 | 10/2015 | Steinwandel et al. | |
| 2015/0367950 A1 | 12/2015 | Rajashekara et al. | |
| 2016/0023773 A1 | 1/2016 | Himmelmann et al. | |
| 2016/0075224 A1 | 3/2016 | Miu et al. | |
| 2016/0194087 A1 | 7/2016 | Nalim | |
| 2016/0304211 A1 | 10/2016 | Swann | |
| 2016/0325629 A1 | 11/2016 | Siegel et al. | |
| 2017/0002744 A1 | 1/2017 | Poumarede et al. | |
| 2017/0057650 A1 | 3/2017 | Walter-Robinson | |
| 2017/0058785 A1 | 3/2017 | Laskowski | |
| 2017/0096233 A1 | 4/2017 | Mercier-Calvairac et al. | |
| 2017/0226934 A1 | 8/2017 | Robic et al. | |
| 2017/0247114 A1 | 8/2017 | Moulon et al. | |
| 2018/0127104 A1 | 5/2018 | Kobayashi et al. | |

FOREIGN PATENT DOCUMENTS

| | | |
|---|---|---|
| EP | 2636596 A2 | 9/2013 |
| EP | 2985901 A1 | 2/2016 |
| WO | WO2014/158240 A2 | 10/2014 |
| WO | WO2016/020618 A1 | 2/2016 |
| WO | WO2016/062945 A1 | 4/2016 |

OTHER PUBLICATIONS

European Search Report Corresponding to EP Application 18179869 dated Oct. 17, 2018.
European Search Report Corresponding to EP Application 18179872 dated Oct. 5, 2018.
European Search Report Corresponding to EP Application 18179873 dated Oct. 5, 2018.

* cited by examiner

PROPULSION SYSTEM FOR AN AIRCRAFT

FIELD

The present subject matter relates generally to a hybrid-electric propulsion system, and a method for operating the hybrid electric propulsion system during hot ambient conditions and/or hot turbomachine conditions.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft.

When operating during hot ambient conditions, a maximum amount of thrust the propulsion system may produce is generally reduced as the hot ambient air ingested by the turbofan jet engines causes the turbofan jet engines to reach a maximum internal temperature threshold more quickly. Accordingly, when an aircraft including the propulsion system is operated in such hot ambient conditions, a maximum payload may be limited, a runway distance required for takeoff may be increased, etc.

Further, when the turbofan jet engines are operated at or near maximum internal temperature thresholds, such as maximum exhaust gas temperature thresholds, the turbofan jet engines may experience undesirable and premature wear. Such may lead to a reduction in an overall time wing for the turbofan jet engines, and an increase in necessary maintenance.

Accordingly, a propulsion system capable of operating during hot ambient conditions without significantly reducing the maximum amount of thrust available would be useful. Additionally, the propulsion system capable of maintaining the turbofan jet engines below the maximum internal temperature thresholds would be particularly beneficial.

BRIEF DESCRIPTION

Aspects and advantages of the invention will be set forth in part in the following description, or may be obvious from the description, or may be learned through practice of the invention.

In one exemplary aspect of the present disclosure, a method is provided for operating a turbomachine of a hybrid-electric propulsion system of an aircraft. The hybrid-electric propulsion system includes a turbomachine and an electrical system, the electrical system including an electric machine coupled to the turbomachine. The method includes receiving, by one or more computing devices, a command to accelerate the turbomachine to provide a desired thrust output; receiving, by the one or more computing devices, data indicative of a temperature parameter approaching or exceeding an upper threshold; and providing, by the one or more computing devices, electrical power to the electric machine to add power to the turbomachine to provide, or assist with providing, the desired thrust output in response to receiving the command to accelerate the turbomachine and receiving the data indicative of the temperature parameter approaching or exceeding the upper threshold.

In certain exemplary aspects receiving, by one or more computing devices, the command to accelerate the turbomachine to provide the desired thrust output includes receiving, by one or more computing devices, the command to accelerate the turbomachine during a pre-cruise flight condition to provide the desired thrust output. For example, in certain exemplary aspects the pre-cruise flight condition is a takeoff flight condition or a climb flight condition.

In certain exemplary aspects receiving, by the one or more computing devices, data indicative of the temperature parameter approaching or exceeding the upper threshold includes receiving, by the one or more computing devices, data indicative of an ambient temperature approaching or exceeding a hot day condition threshold for the turbomachine. For example, in certain exemplary aspects receiving, by the one or more computing devices, data indicative of the ambient temperature approaching or exceeding the hot day condition threshold includes receiving, by the one or more computing devices, data from an ambient temperature sensor. For example, in certain exemplary aspects receiving, by the one or more computing devices, data indicative of the ambient temperature approaching or exceeding the hot day condition threshold includes receiving, by one or more computing devices, data from a temperature sensor within the turbomachine.

In certain exemplary aspects receiving, by the one or more computing devices, data indicative of the temperature parameter approaching or exceeding the upper threshold includes determining, by the one or more computing devices, a delta value indicative of how far the temperature parameter is above the upper threshold, and wherein providing, by the one or more computing devices, electrical power to the electric machine includes modulating, by the one or more computing devices, the amount of electrical power provided to the electric machine based at least in part on the determined delta value.

In certain exemplary aspects the method further includes receiving, by the one or more computing devices, data indicative of a turbomachine health parameter, and wherein providing, by the one or more computing devices, electrical power to the electric machine includes modulating, by the one or more computing devices, the amount of electrical power provided to the electric machine based at least in part on the received data indicative of the turbomachine health parameter.

In certain exemplary aspects the hybrid electric propulsion system further includes an electric energy storage unit, and wherein providing, by the one or more computing devices, electrical power to the electric machine includes providing, by the one or more computing devices, electrical power to the electric machine from the electric energy storage unit.

In certain exemplary aspects the hybrid electric propulsion system further includes an electric energy storage unit, and the method further includes receiving, by the one or more computing devices, data indicative of a charge level of the electric energy storage unit; and terminating, by the one or more computing devices, the provision of electrical power to the electric machine at least in part in response to receiving, by the one or more computing devices, the data indicative of the charge level of the electric energy storage unit.

In certain exemplary aspects the method further includes receiving, by the one or more computing devices, data indicative of a temperature of the electric machine; and terminating, by the one or more computing devices, the provision of electrical power to the electric machine at least in part in response to receiving, by the one or more computing devices, the data indicative of the temperature of the electric machine.

In certain exemplary aspects the method further includes receiving, by the one or computing devices, data indicative of an operability parameter of the turbomachine; and terminating, by the one or more computing devices, the provision of electrical power to the electric machine at least in part in response to the received data indicative of the operability parameter of the turbomachine. For example, in certain exemplary aspects the data indicative of the operability parameter is indicative of at least one of: a speed parameter of one or more components of the turbomachine, a fuel flow to a combustion section of the turbomachine, an internal pressure of the turbomachine, or an internal temperature of the turbomachine.

In certain exemplary aspects receiving, by the one or more computing devices, data indicative of the temperature parameter approaching or exceeding the upper threshold includes receiving, by the one or more computing devices, data indicative of an exhaust gas temperature parameter approaching or exceeding an upper exhaust gas temperature parameter threshold. For example, in certain exemplary aspects the exhaust gas temperature parameter is indicative of an exhaust gas temperature, and wherein the upper exhaust gas temperature parameter threshold is a predetermined exhaust gas temperature threshold. For example, in certain exemplary aspects the exhaust gas temperature parameter is indicative of a rate of change of the exhaust gas temperature, and wherein the upper exhaust gas temperature parameter threshold is a predetermined exhaust gas temperature rate of change threshold.

In certain exemplary aspects providing, by the one or more computing devices, electrical power to the electric machine includes providing at least about fifteen horsepower of mechanical power to the turbomachine.

In an exemplary embodiment of the present disclosure, a hybrid-electric propulsion system for an aircraft is provided. The hybrid-electric propulsion system includes a propulsor; a turbomachine coupled to the propulsor for driving the propulsor and generating thrust; an electrical system including an electric machine and an electric energy storage unit electrically connectable to the electric machine, the electric machine coupled to the turbomachine; and a controller. The controller is configured to receive a command to accelerate the turbomachine to provide a desired thrust output and to received data indicative of a temperature parameter approaching or exceeding an upper threshold, the controller further configured to provide electrical power to the electric machine to add power to the turbomachine to provide, or assist with providing, the desired thrust output in response to receiving the command to accelerate the turbomachine and receiving the data indicative of the temperature parameter approaching or exceeding the upper threshold.

In certain exemplary embodiments the command to accelerate the turbomachine to provide the desired thrust output received by the controller is a command to accelerate the turbomachine during a pre-cruise flight condition to provide the desired thrust output.

In certain exemplary embodiments the data indicative of the temperature parameter approaching or exceeding the upper threshold includes data indicative of an exhaust gas temperature parameter approaching or exceeding an upper exhaust gas temperature parameter threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
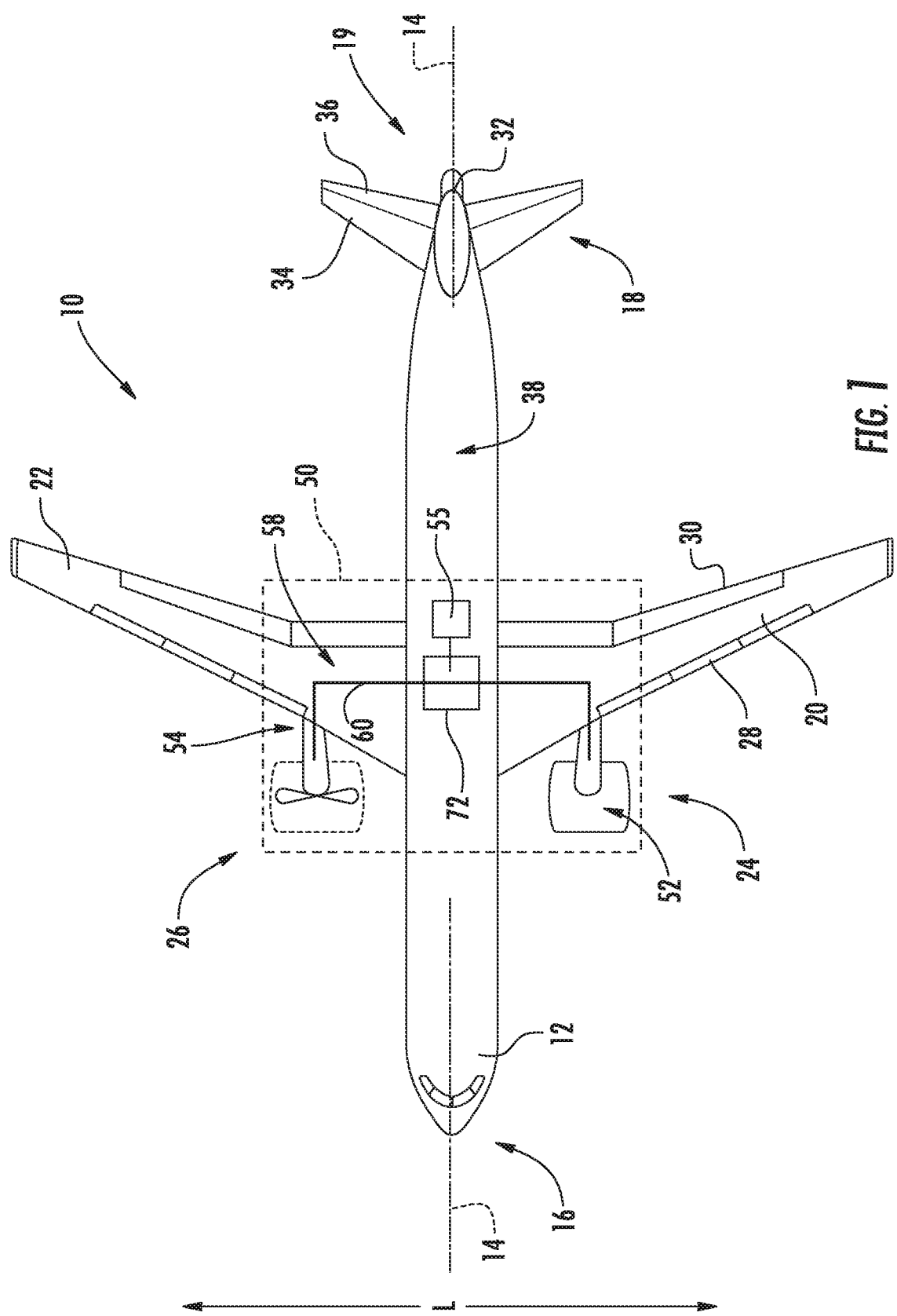
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a hybrid electric propulsion system having a turbomachine, a propulsor coupled to the turbomachine, and an electrical system. The electrical system includes an electric machine and an electric energy storage unit electrically connectable to the electric machine. Additionally, the electric machine is coupled to the turbomachine such that rotation of the turbomachine rotates the electric machine, and similarly, rotation of the electric machine rotate one or more components of the turbomachine.

In certain operations of the hybrid electric propulsion system, the hybrid electric propulsion system is operable to assist with an acceleration of the turbomachine during hot ambient conditions and/or hot internal turbomachine conditions. For example, in certain exemplary aspects, the hybrid electric propulsion system may receive a command to accelerate the turbomachine to provide a desired thrust output, and further may receive data indicative of a temperature parameter approaching or exceeding an upper threshold. Further, in response to the received command and the received data, the hybrid electric propulsion system may provide electrical power to the electric machine to and power to the turbomachine to provide, or assist with providing, the desired thrust output. For example, the power added by the electric machine to the turbomachine may increase a rotational speed of a shaft or spool within the turbomachine, which may, in turn, increase a rotational speed of the propulsor being driven by the turbomachine such that the hybrid electric propulsion system produces more thrust for the aircraft.

In certain exemplary aspects, the command to accelerate the turbomachine may be received during a pre-cruise flight condition, such as a takeoff flight condition or a cruise flight condition. With such an exemplary aspect, the temperature parameter may be an ambient temperature parameter, such as in a situation in which the aircraft including the hybrid electric propulsion system is taking off during a hot day condition.

Additionally, or alternatively, the command to accelerate the turbomachine may received during a flight condition, such as during a cruise flight condition. Such a command may be for, e.g., a step climb procedure, or other maneuver requiring the turbomachine to accelerate. With such an exemplary aspect, the temperature parameter may be an internal temperature parameter for the turbomachine, such as an exhaust gas temperature parameter.

Regardless, the provision of electrical power to the electric machine to add power to the turbomachine to provide, or assist with providing, the desired thrust output may allow for the hybrid electric propulsion system to provide the desired thrust output despite, e.g., the hot day conditions and/or the hot internal turbomachine conditions.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
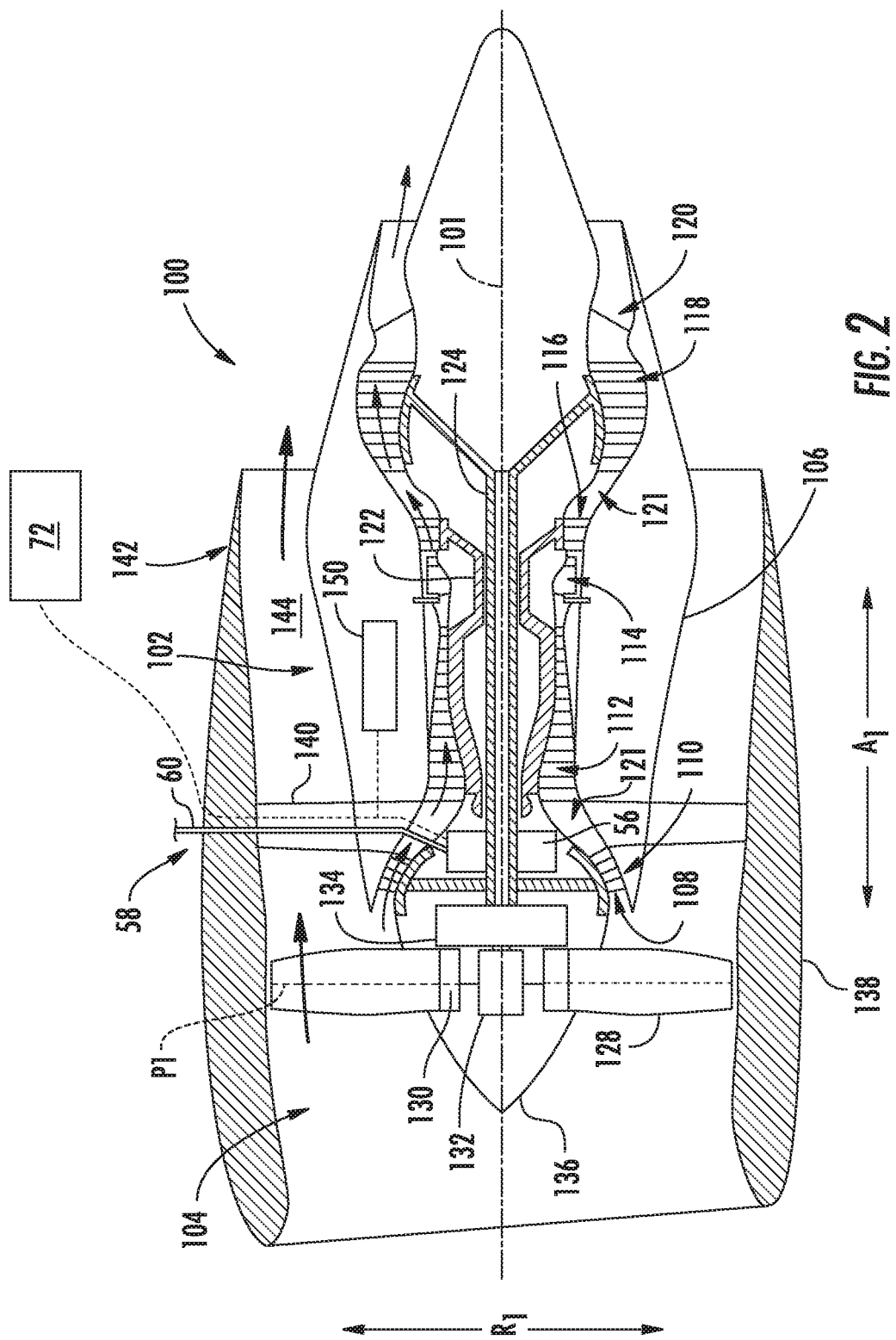
FIG. 2 is a schematic, cross-sectional view of a gas turbine engine mounted to the exemplary aircraft of FIG. 1.
Figure 3:
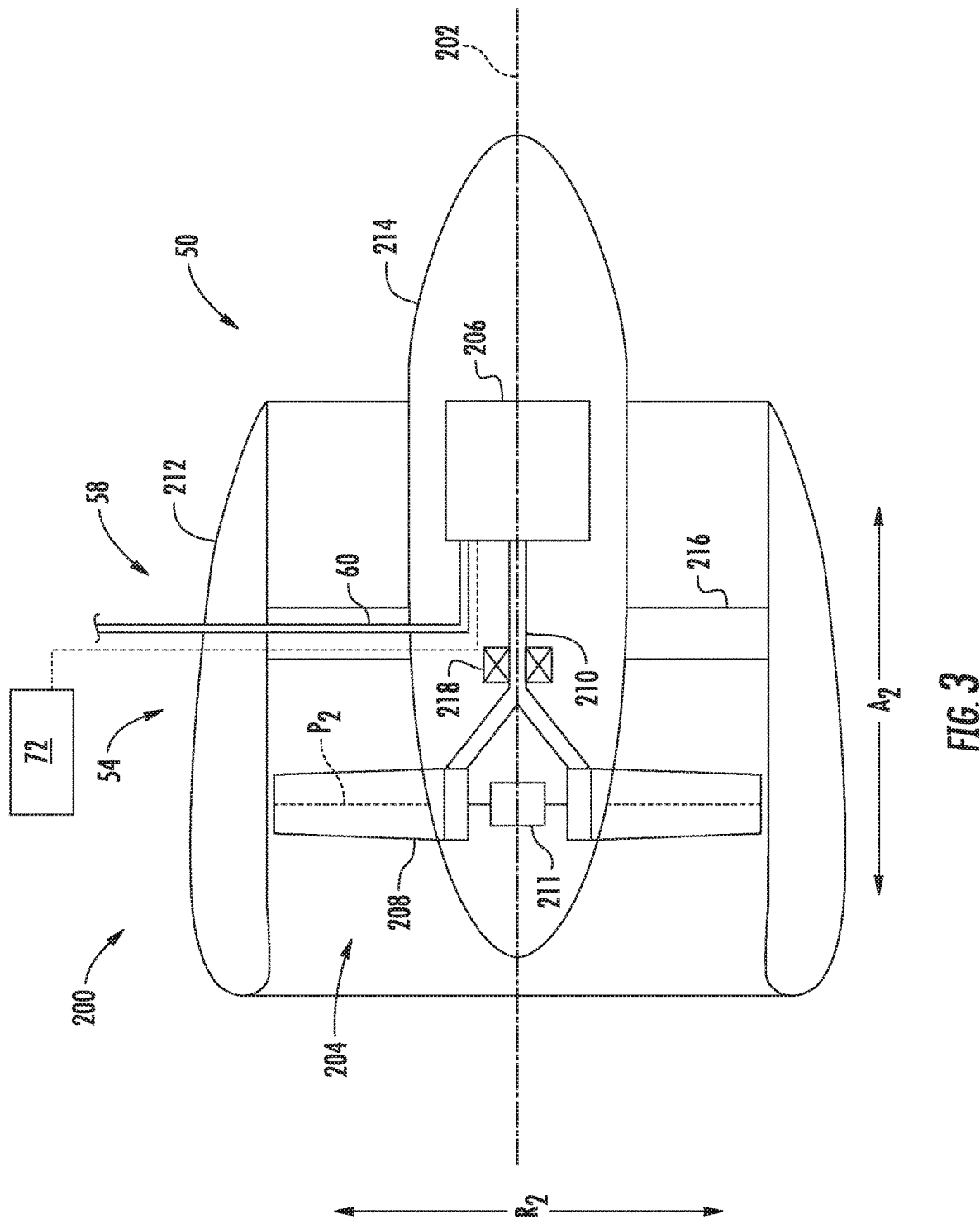
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

More particularly, referring generally to FIGS. 1 through 3, the exemplary hybrid-electric propulsion system 50 generally includes the first propulsor assembly 52 having a turbomachine and a prime propulsor (which, for the embodiment of FIG. 2 are configured together as a gas turbine engine, or rather as a turbofan engine 100), an electric machine 56 (which for the embodiment depicted in FIG. 2 is an electric motor/generator) drivingly coupled to the turbomachine, the second propulsor assembly 54 (which for the embodiment of FIG. 3 is configured as an electric propulsor assembly 200), an electric energy storage unit 55 (electrically connectable to the electric machine 56 and/or the electric propulsor assembly 200), a controller 72, and a power bus 58. The electric propulsor assembly 200, the electric energy storage unit 55, and the electric machine 56 are each electrically connectable to one another through one or more electric lines 60 of the power bus 58. For example, the power bus 58 may include various switches or other power electronics movable to selectively electrically connect the various components of the hybrid electric propulsion system 50. Additionally, the power bus 58 may further include power electronics, such as inverters, converters, rectifiers, etc., for conditioning or converting electrical power within the hybrid electric propulsion system 50.

As will be appreciated, the controller 72 may be configured to distribute electrical power between the various components of the hybrid-electric propulsion system 50. For example, the controller 72 may be operable with the power bus 58 (including the one or more switches or other power electronics) to provide electrical power to, or draw electrical power from, the various components, such as the electric machine 56, to operate the hybrid electric propulsion system 50 between various operating modes and perform various functions. Such is depicted schematically as the electric lines 60 of the power bus 58 extending through the controller 72, and will be discussed in greater detail below.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc. For example, the controller 72 may be configured in substantially the same manner as the exemplary computing system 500 described below with reference to FIG. 6 (and may be configured to perform one or more of the functions of the exemplary method 300, described below).

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical power. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about one thousand kilowatt hours of electrical power.

Referring now particularly to FIGS. 1 and 2, the first propulsor assembly 52 includes a gas turbine engine mounted, or configured to be mounted, to the first wing 20 of the aircraft 10. More specifically, for the embodiment of FIG. 2, the gas turbine engine includes a turbomachine 102 and a propulsor, the propulsor being a fan (referred to as "fan 104" with reference to FIG. 2). Accordingly, for the embodiment of FIG. 2, the gas turbine engine is configured as a turbofan engine 100.

The turbofan engine 100 defines an axial direction A1 (extending parallel to a longitudinal centerline 101 provided for reference) and a radial direction R1. As stated, the turbofan engine 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121 through the turbomachine 102.

The exemplary turbomachine 102 of the turbofan engine 100 additionally includes one or more shafts rotatable with at least a portion of the turbine section and, for the embodiment depicted, at least a portion of the compressor section. More particularly, for the embodiment depicted, the turbofan engine 100 includes a high pressure (HP) shaft or spool 122, which drivingly connects the HP turbine 116 to the HP compressor 112. Additionally, the exemplary turbofan engine 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan engine 100 includes an annular fan casing or outer nacelle 138 that circumferentially surrounds the fan 104 and/or at least a portion of the turbomachine 102. Accordingly, the exemplary turbofan engine 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine 56, which for the embodiment depicted is configured as an electric motor/generator. The electric machine 56 is, for the embodiment depicted, positioned within the turbomachine 102 of the turbofan engine 100, inward of the core air flowpath 121, and is coupled to/in mechanical communication with one of the shafts of the turbofan engine 100. More specifically, for the embodiment depicted, the electric machine is coupled to the second, LP turbine 118 through the LP shaft 124. The electric machine 56 may be configured to convert mechanical power of the LP shaft 124 to electrical power (such that the LP shaft 124 drives the electric machine 56), or alternatively the electric machine 56 may be configured to convert electrical power provided thereto into mechanical power for the LP shaft 124 (such that the electric machine 56 drives, or assists with driving, the LP shaft 124).

It should be appreciated, however, that in other exemplary embodiments, the electric machine 56 may instead be positioned at any other suitable location within the turbomachine 102 or elsewhere. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through, e.g., the HP shaft 122, or by both the LP system (e.g., the LP shaft 124) and the HP system (e.g., the HP shaft 122) via a dual drive system. Additionally, or alternatively, still, in other embodiments, the electric machine 56 may include a plurality of electric machines, e.g., with one being drivingly connected to the LP system (e.g., the LP shaft 124) and one being drivingly connected to the HP system (e.g., the HP shaft 122). Further, although the electric machine 56 is described as an electric motor/generator, in other exemplary embodiments, the electric machine 56 may be configured solely as an electric generator.

Notably, in certain exemplary embodiments, the electric machine 56 may be configured to generate at least about ten kilowatts of electrical power when driven by the turbomachine 102, such as at least about fifty kilowatts of electrical power, such as at least about sixty-five kilowatts of electrical power, such as at least about seventy-five kilowatts of electrical power, such as at least about one hundred kilowatts of electrical power, such as up to five thousand kilowatts of electrical power. Additionally, or alternatively, the electric machine 56 may be configured to provide, or otherwise add, at least about fifteen horsepower of mechanical power to the turbomachine 102 when the electric machine 56 is provided electrical power from, e.g., the electric energy storage unit 55. For example, in certain exemplary embodiments, the electric machine 56 may be configured to provide at least about fifty horsepower of mechanical power to the turbomachine 102, such as at least about seventy-five horsepower, such as at least about one hundred horsepower, such as at least about one hundred and twenty horsepower, such as up to about seven thousand horsepower.

Referring still to FIGS. 1 and 2, the turbofan engine 100 further includes a controller 150 and a plurality of sensors (not shown). The controller 150 may be a full authority digital engine control system, also referred to as a FADEC. The controller 150 of the turbofan engine 100 may be configured to control operation of, e.g., the actuation member 132, the fuel delivery system, etc. Additionally, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric machine 56, the second propulsor assembly 54, and the energy storage unit 55 through a suitable wired or wireless communication system (depicted in phantom).

Moreover, although not depicted, in certain exemplary embodiments, the turbofan engine 100 may further include one or more sensors positioned to, and configured to, sense data indicative of one or more operational parameters of the turbofan engine 100. For example, the turbofan engine 100 may include one or more temperature sensors configured to sense a temperature within a core air flowpath 121 of the turbomachine 102. For example, such sensors may be configured to sense an exhaust gas temperature at an exit of the combustion section 114. Additionally, or alternatively, the turbofan engine 100 may include one or more pressure sensors to sense data indicative of a pressure within the core air flowpath 121 of the turbomachine 102, such as within a combustor within the combustion section 114 of the turbomachine 102. Further, in still other exemplary embodiments, the turbofan engine 100 may also include one or more speed sensors configured to sense data indicative of a rotational speed of one or more components of the turbofan engine 100, such as one or more of the LP spool 124 or the HP spool 122. Additionally, in certain exemplary embodiments, the turbofan engine 100, the hybrid electric propulsion system as a whole, and/or an aircraft incorporating the hybrid electric propulsion system, may include one or more ambient conditions sensors, such as one or more ambient temperature sensors, positioned outside the core air flowpath 121 of the turbomachine 102 for sensing data indicative of an ambient condition, such as an ambient temperature. Accordingly, in at least certain exemplary embodiments, the hybrid electric propulsion system may receive information regarding one or more ambient conditions from the aircraft. Notably, however, in other exemplary embodiments, ambient conditions may be sensed within the core air flowpath 121 of the turbomachine 102, e.g., at the inlet 108.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the turbofan engine 100 may be configured as any other suitable gas turbine engine. For example, in other embodiments, the turbofan engine 100 may instead be configured as a turboprop engine, an unducted turbofan engine, a turbojet engine, a turboshaft engine, etc.

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electrical power source (e.g., the electric machine 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric machine 56 and/or the electric energy storage unit 55 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of gas turbine engines (such as turbofan engine 100) and electric machines 56.

Further, in other exemplary embodiments, the electric propulsor assembly(ies) 200 and/or gas turbine engine(s) and electric machine(s) 56 may be mounted to the aircraft 10 at any other suitable location in any other suitable manner (including, e.g., tail mounted configurations). For example, in certain exemplary embodiments, the electric propulsor assembly may be configured to ingest boundary layer air and reenergize such boundary layer air to provide a propulsive benefit for the aircraft (the propulsive benefit may be thrust, or may simply be an increase in overall net thrust for the aircraft by reducing a drag on the aircraft).

Moreover, in still other exemplary embodiments, the exemplary hybrid electric propulsion system 50 may have still other configurations. For example, in other exemplary embodiments, the hybrid electric propulsion system 50 may not include a "pure" electric propulsor assembly. For example, referring now briefly to FIG. 4, a schematic diagram of a hybrid-electric propulsion system 50 in accordance with yet another exemplary embodiment of the present disclosure is provided. The exemplary hybrid electric propulsion system 50 depicted in FIG. 4 may be configured in a similar manner as one or more the exemplary hybrid electric propulsion systems 50 described above with reference to FIGS. 1 through 3.

Figure 4:
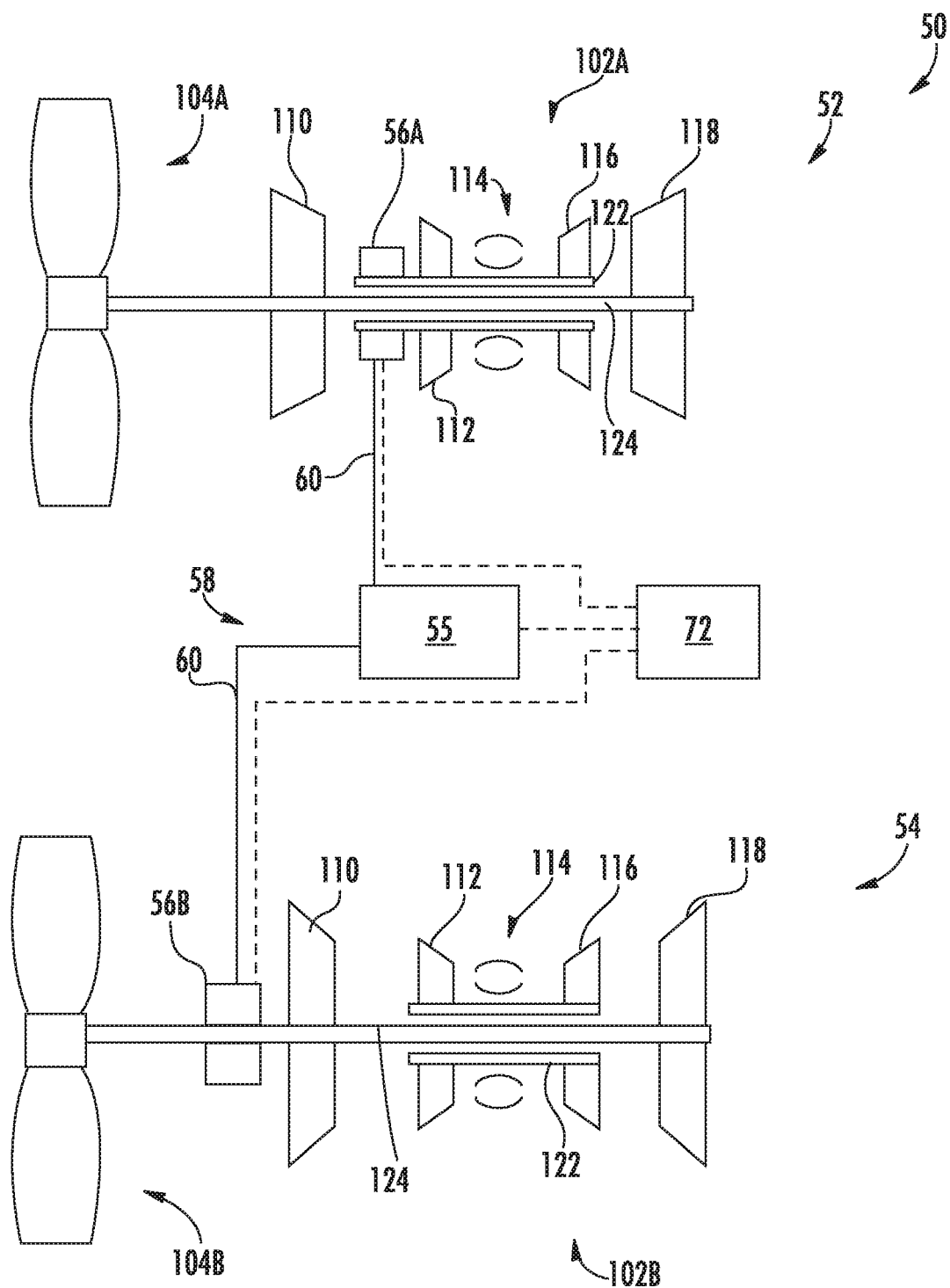
FIG. 4 is a schematic view of a propulsion system in accordance with another exemplary embodiment of the present disclosure.

For example, the exemplary hybrid-electric propulsion system 50 of FIG. 4 generally includes a first propulsor assembly 52 and a second propulsor assembly 54. The first propulsor assembly generally includes a first turbomachine 102A and a first propulsor 104A, and similarly, the second propulsor assembly 54 generally includes a second turbomachine 102B and a second propulsor 104B. Each of the first and second turbomachines 102A, 102B generally includes a low pressure system having a low pressure compressor 110 drivingly coupled to a low pressure turbine 118 through a low pressure shaft 124, as well as a high pressure system having a high pressure compressor 112 drivingly coupled to a high pressure turbine 116 through a high pressure shaft 122. Additionally, the first propulsor 104A is drivingly coupled to the low pressure system of the first turbomachine 102A and the second propulsor 104B is drivingly coupled to the low pressure system of the second turbomachine 102B. In certain exemplary embodiments, the first propulsor 104A and first turbomachine 102A may be configured as a first turbofan engine and similarly, the second propulsor 104B and second turbomachine 102B may be configured as a second turbofan engine (e.g., similar to the exemplary turbofan engine 100 of FIG. 2). Alternatively, however, these components may instead be configured as parts of a turboprop engine or any other suitable turbomachine-driven propulsion device. Further, in certain exemplary embodiments, the first propulsor assembly 52 may be mounted to a first wing of an aircraft and the second propulsor assembly 54 may be mounted to a second wing of the aircraft (similar, e.g., to the exemplary embodiment of FIG. 1). Of course, in other exemplary embodiments, any other suitable configuration may be provided (e.g., both may be mounted to the same wing, one or both may be mounted to a tail of the aircraft, etc.).

Moreover, the hybrid electric propulsion system 50 of FIG. 4 additionally includes an electrical system. The electrical system includes a first electric machine 56A, a second electric machine 56B, and an electric energy storage unit 55 electrically connectable to the first electric machine 56A and second electric machine 56B. The first electric machine 56A is additionally coupled to the first turbomachine 102A. More specifically, for the embodiment depicted, the first electric machine 56A is coupled to the high pressure system of the first turbomachine 102A, and more specifically still, is coupled to the high-pressure spool 122 of the first turbomachine 102A. In such a manner, the first electric machine 56A may extract power from the high pressure system of the first turbomachine 102A and/or provide power to the high-pressure system of the first turbomachine 102A.

Further, it will be appreciated that for the embodiment depicted, the second propulsor assembly 54 is not configured as a pure electric propulsor assembly. Instead, the second propulsor assembly 54 is configured as part of a hybrid electric propulsor. More particularly, the second electric machine 56B is coupled to the second propulsor 104B, and is further coupled to the low pressure system of the second turbomachine 102B. In such a manner, the second electric machine 56B may extract power from the low pressure system of the second turbomachine 102B and/or provide power to the low pressure system of the first turbomachine 102A. More particularly, in certain exemplary aspects, the second electric machine 56 may drive, or assist with driving the second propulsor 104B.

As is also depicted in FIG. 4, the exemplary hybrid electric propulsion system 50 further includes a controller 72 and a power bus 58. The first electric machine 56A, the second electric machine 56B, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough. Accordingly, in certain operations, the first electric machine 56A may provide electrical power to the second electric machine 56B, or vice versa. Additionally, or alternatively, the first electric machine 56A and/or the second electric machine 56B may provide electrical power to the electric energy storage unit 55, or the electric energy storage unit 55 may provide electrical power to the first electric machine 56A and/or the second electric machine 56B.

Furthermore, it should be appreciated that in still other exemplary embodiments, the exemplary hybrid electric propulsion system 50 may have other suitable configurations. For example, although the exemplary embodiment of FIG. 4 includes a first electric machine 56A coupled to the high-pressure system of the first turbomachine 102A and the second electric machine 56B coupled to the low pressure system of the second turbomachine 102B, in other exemplary embodiments, each of the electric machines 56A, 56B may be coupled to the low pressure system, or alternatively may be coupled to the high-pressure system. Alternatively, in other exemplary embodiments the electrical system may further include an additional electric machine coupled to the low pressure system of the first turbomachine 102A and/or an additional electric machine coupled to the high-pressure system of the second turbomachine 102B.

Figure 5:
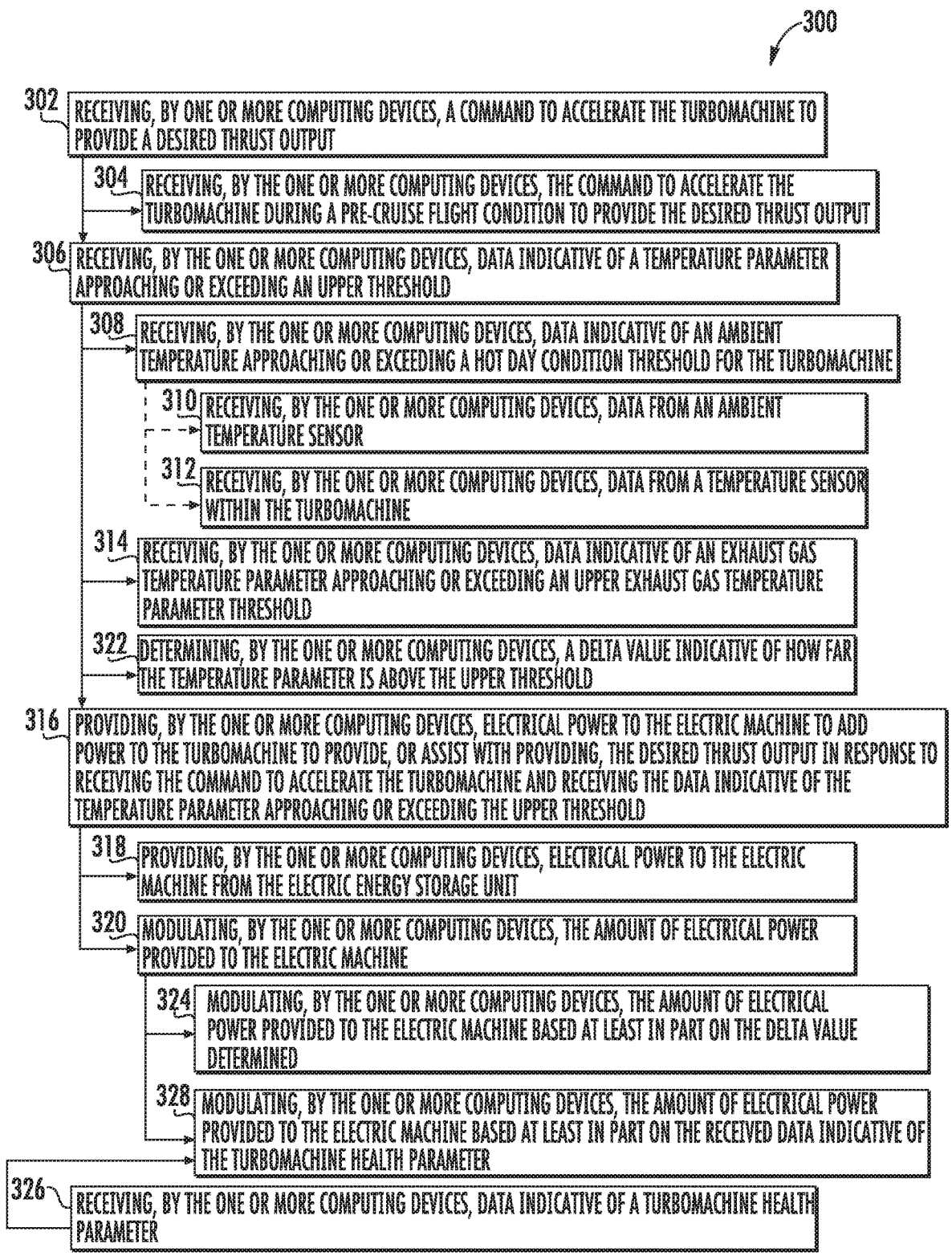
FIG. 5 is a flow diagram of a method for operating a hybrid electric propulsion system of an aircraft in accordance with an exemplary aspect of the present disclosure.

Referring now to FIG. 5, a flow diagram of a method 300 for operating a hybrid electric propulsion system of an aircraft is provided. The method 300 may generally be operable with one or more of the exemplary hybrid electric propulsion systems described above with reference to FIGS. 1 through 4. For example, the hybrid electric propulsion system may generally include a turbomachine and an electrical system, with the electrical system including an electric machine coupled to the turbomachine and an electric energy storage unit. The electric energy storage unit may be electrically connectable to the electric machine. Notably, in certain exemplary aspects, the hybrid electric propulsion system may further include a propulsor coupled to the turbomachine.

As is depicted, the method 300 includes at (302) receiving, by one or more computing devices, a command to accelerate the turbomachine to provide a desired thrust output. For the exemplary aspect depicted, receiving, by the one or more computing devices, the command to accelerate the turbomachine to provide the desired thrust output at (302) includes at (304) receiving, by the one or more computing devices, the command to accelerate the turbomachine during a pre-cruise flight condition to provide the desired thrust output. The pre-cruise flight condition may be, for example, a takeoff flight condition or a climb flight condition. Alternatively, however, in other exemplary aspects, the command received at (302) may be received during any other suitable flight condition requiring an acceleration of the turbomachine. For example, the command received at (302) may be received during a cruise operating mode in order to perform, e.g., a step climb maneuver. Regardless, the command to accelerate the turbomachine may be received from, e.g., a flight crew member of the aircraft through one or more input devices of the aircraft, or alternatively may be received as part of a control algorithm executed by a controller of the hybrid electric propulsion system and/or aircraft.

The method 300 further includes at (306) receiving, by the one or more computing devices, data indicative of a temperature parameter approaching or exceeding an upper threshold. Notably, as used herein, the term "approaching or exceeding" refers to a parameter value being within a predetermined range of a threshold, or being above the threshold. In certain exemplary aspects, such as the exemplary aspect depicted, receiving, by the one or more computing devices, data indicative of the temperature parameter approaching or exceeding the upper threshold at (306) includes at (308) receiving, by the one or more computing devices, data indicative of an ambient temperature approaching or exceeding a hot day condition threshold for the turbomachine. The hot day condition threshold may be a temperature threshold above which the turbomachine is limited in an amount of effective output power it may produce by virtue of the ingested ambient air being too hot. For example, as will be appreciated, as the turbomachine combusts fuel, an amount of heat is added to the airflow through the engine. As a starting temperature (i.e., an ambient temperature) of the airflow provided to the turbomachine increases, less heat, or energy, may be added thereto before thermal limits within the turbomachine are reached. In such a manner, the relatively high ambient temperature may limit the turbomachine's performance. In certain exemplary aspects, the hot day condition threshold may be approximately eighty-five degrees Fahrenheit. However, for other hybrid electric propulsion systems, or rather, for other turbomachines, the hot day temperature threshold may have any other value.

In certain exemplary aspects, the data indicative of the ambient temperature may be received from, e.g., an ambient temperature sensor located outside of the turbomachine (e.g., on the aircraft), or alternatively, an internal temperature sensor located within the turbomachine (e.g., at an inlet to the turbomachine). Accordingly, as is depicted in phantom, in certain exemplary aspects, receiving, by the one or more computing devices, data indicative of the ambient temperature approaching or exceeding the hot day condition threshold may include at (310) receiving, by the one or more computing devices, data from an ambient temperature sensor, or alternatively, at (312) receiving, by the one or more computing devices, data from a temperature sensor within the turbomachine.

However, in other exemplary aspects of the present disclosure, the temperature parameter may be any other suitable temperature parameter. For example, as is also shown in the exemplary aspect of the method 300 depicted in FIG. 5, in at least certain exemplary aspects, receiving, by the one or more computing devices, data indicative of the temperature parameter approaching or exceeding the upper threshold at (306) includes at (314) receiving, by the one or more computing devices, data indicative of an exhaust gas temperature parameter approaching or exceeding an upper exhaust gas temperature parameter threshold. For example, in at least certain exemplary aspects, the exhaust gas temperature parameter may be indicative of an exhaust gas temperature within the turbomachine. In such an exemplary aspect, the upper exhaust gas temperature parameter threshold may be a predetermined exhaust gas temperature threshold. Additionally, or alternatively, in certain exemplary aspects, the exhaust gas temperature parameter may be indicative of a rate of change of the exhaust gas temperature within the turbomachine. With such an exemplary aspect, the upper exhaust gas temperature parameter threshold may be a predetermined exhaust gas temperature rate of change threshold. As will be appreciated, operating the turbomachine at or near a thermal limit of the turbomachine, e.g., as may be determined by the exhaust gas temperature parameter, may cause premature wear within the engine by thermally stressing various components within the engine.

Moreover, the exemplary aspect depicted further includes at (316) providing, by the one or more computing devices, electrical power to the electric machine to add power to the turbomachine to provide, or assist with providing, the desired thrust output in response to receiving the command to accelerate the turbomachine at (302) and receiving the data indicative of the temperature parameter approaching or exceeding the upper threshold at (306). For example, for the exemplary aspect depicted providing, by the one or more computing devices, electrical power to the electric machine at (316) includes at (318) providing, by the one or more computing devices, electrical power to the electric machine from the electric energy storage unit. Additionally, it will be appreciated that in at least certain exemplary aspects, providing, by the one or more computing devices, electrical power to the electric machine at (316) may include providing at least about fifteen horsepower of mechanical power to the turbomachine. It will be appreciated, however, that in other exemplary aspects of the method 300, providing, by the one or more computing devices, electrical power to the electric machine at (316) may additionally, or alternatively, include providing electrical power to the electric machine from a second electric machine coupled to a second turbomachine (see, e.g., embodiment of FIG. 4).

By providing the electrical power to the electric machine in accordance with one or more exemplary aspects of the present disclosure, the hybrid electric propulsion system may provide the desired thrust output despite the relatively high ambient temperatures and/or relatively high temperatures internal to the turbomachine. Such may therefore provide for more versatile and efficient hybrid electric propulsion system Referring still to the exemplary method 300 depicted in FIG. 5, it will further be appreciated that in at least certain exemplary aspects, providing, by the one or more computing devices, electrical power to the electric machine at (316) may include providing a substantially constant amount of electrical power for an amount of time. However, for the exemplary aspect of the method 300 depicted, providing, by the one or more computing devices, electrical power to the electric machine at (316) includes at (320) modulating, by the one or more computing devices, the amount of electrical power provided to the electric machine.

More specifically, for the exemplary aspect depicted, it will be appreciated that receiving, by the one or more computing devices, data indicative of the temperature parameter approaching or exceeding the upper threshold at (306) further includes at (322) determining, by the one or more computing devices, a delta value indicative of how far the temperature parameter is above the upper threshold. For example, in certain exemplary aspects, determining the delta value at (322) may include determining a delta value indicative of how far the ambient temperature is above the hot day condition threshold, or alternatively how far the exhaust gas temperature parameter is above the upper exhaust gas temperature parameter threshold. Regardless, with such an exemplary aspect, modulating, by the one or more computing devices, the amount of electrical power provided to the electric machine at (320) includes at (324) modulating, by the one or more computing devices, the amount of electrical power provided to the electric machine based at least in part on the delta value determined at (322). For example, the higher the delta value that is determined, the more electrical power the method 300 may provide to the electric machine.

It will be appreciated, however, that in other exemplary aspects, the method 300 may modulate the amount of electrical power at (320) based on any other suitable parameter. For example, as is also depicted in FIG. 5, the method 300 further includes at (326) receiving, by the one or more computing devices, data indicative of a turbomachine health parameter. The turbomachine health parameter may be any parameter indicative of an amount of degradation the turbomachine has undergone. With such an exemplary aspect, modulating, by the one or more computing devices, the amount of electrical power provided to the electric machine at (320) includes at (328) modulating, by the one or more computing devices, the amount of electrical power provided to the electric machine based at least in part on the received data indicative of the turbomachine health parameter. For example, the more the turbomachine has degraded, the more electrical power the method 300 may provide to the electric machine, e.g., to compensate for such degradation.

By operating in accordance with one or more these exemplary aspects, the method 300 may provide a sufficient amount of electrical power to the electric machine to assist the turbomachine in providing the desired thrust output, while still conserving electrical power.

Figure 6:
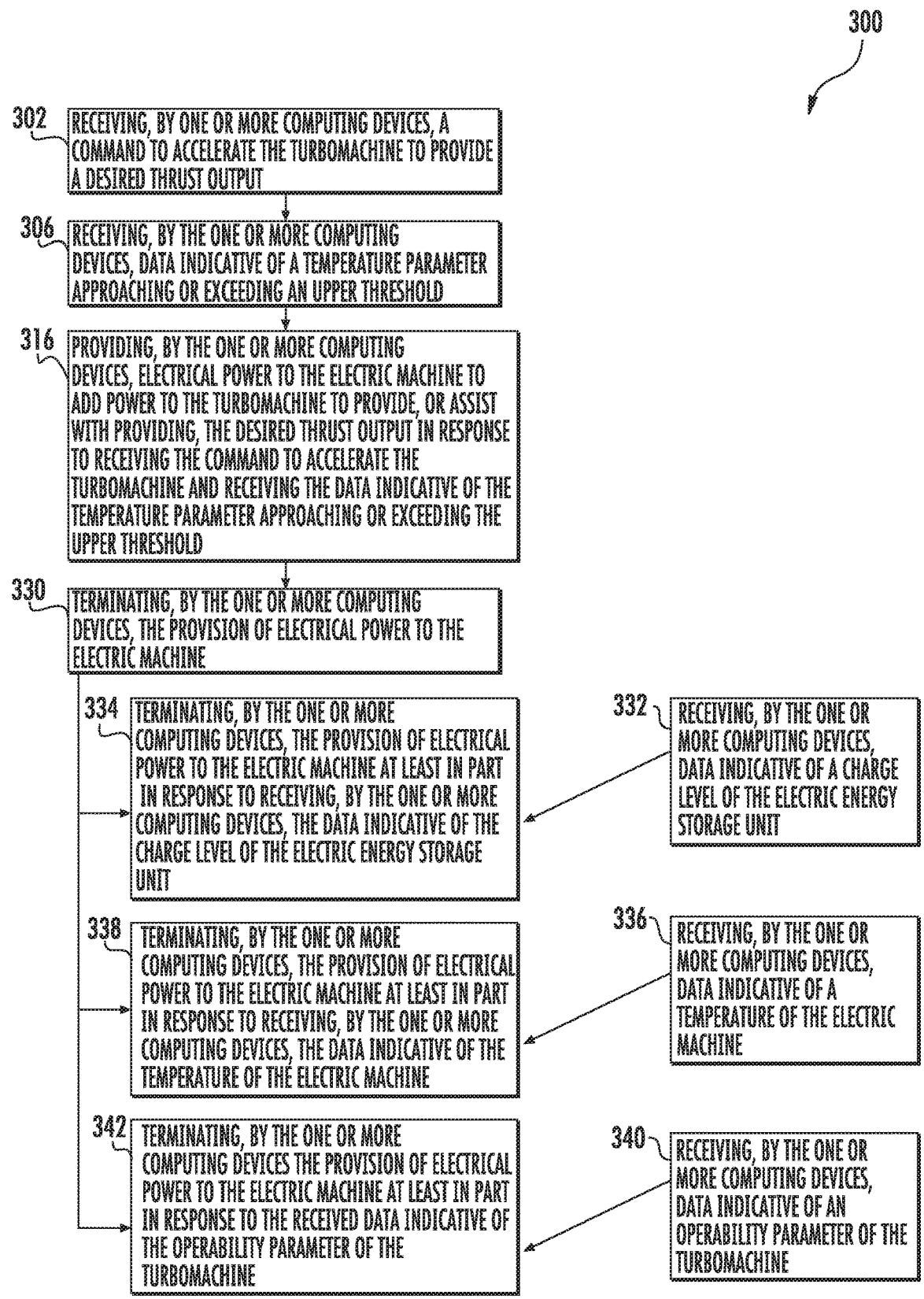
FIG. 6 is a flow diagram of an exemplary aspect of the method of FIG. 5.

Referring now also to FIG. 6, providing a close-up flow diagram of an exemplary aspect of the exemplary method 300 described above, it will be appreciated that the method 300 further includes at (330) terminating, by the one or more computing devices, the provision of electrical power to the electric machine (i.e., terminate the providing of electrical power to the electric machine at (316)). As will be appreciated, terminating, by the one or more computing devices, the provision of electrical power to the electric machine at (330) may be in response to a number of various parameters.

For example, for the exemplary aspect depicted, the method 300 further includes at (332) receiving, by the one or more computing devices, data indicative of a charge level of the electric energy storage unit. The data indicative of the charge level of the electric energy storage unit may be data indicative of the charge level of the electric energy storage unit being below a lower threshold or approaching a lower threshold. For example, the data indicative of the charge level of the electric energy storage unit may be data indicative of the charge level being below a predetermined lower threshold for performing certain operations, such as an engine start or restart, or some other minimum operating threshold for the electric energy storage unit. With such an exemplary aspect, terminating, by the one or more computing devices, the provision of electrical power to the electric machine at (330) includes at (334) terminating, by the one or more computing devices, the provision of electrical power to the electric machine at least in part in response to receiving, by the one or more computing devices, the data indicative of the charge level of the electric energy storage unit at (332).

Moreover, the exemplary aspect of the method 300 depicted in FIG. 6 further includes at (336) receiving, by the one or more computing devices, data indicative of a temperature of the electric machine. The data indicative of the temperature of the electric machine received at (336) may indicate that the electric machine is above a desired operating temperature threshold. For example, the electric machine may be more susceptible to damage when operated above the desired operating temperature threshold. Accordingly, for the exemplary aspect depicted, in order to minimize a risk of damaging the electric machine, terminating, by the one or more computing devices, the provision of electrical power to the electric machine at (330) includes at (338) terminating, by the one or more computing devices, the provision of electrical power to the electric machine at least in part in response to receiving, by the one or more computing devices, the data indicative of the temperature of the electric machine at (336).

Furthermore, the exemplary aspect of the method 300 depicted in FIG. 6 additionally includes at (340) receiving, by the one or more computing devices, data indicative of an operability parameter of the turbomachine. The data indicative of the operability parameter the turbomachine received at (340) may be indicative of a speed parameter of one or more components the turbomachine, a fuel flow to a combustion section of the turbomachine, an internal pressure of the turbomachine, and/or an internal temperature of the turbomachine. For example, the speed parameter of the one or more components of the turbomachine may be a rotational speed of one or more spools within the turbomachine, an acceleration of one or more spools within the turbomachine, or combination thereof. The data indicative of the operability parameter received at (340) may indicate that the turbomachine is operating at a desired operability, such as indicating that the hybrid electric propulsion system is providing the desired thrust output, that the turbomachine is accelerating at a desired rate or otherwise operating a desired rotational speed, etc. Accordingly, for the exemplary aspect, terminating, by the one or more computing devices, the provision of electrical power to the electric machine at (330) includes at (342) terminating, by the one or more computing devices the provision of electrical power to the electric machine at least in part in response to the received data indicative of the operability parameter of the turbomachine at (340). In such a manner, the method 300 may terminate provision of electric power to the electric machine once the operability parameter indicates supplemental power is no longer necessary, or said another way, the method 300 may provide electric power to the electric machine only for so long as supplemental power is necessary.

Operating a hybrid electric propulsion system in accordance with one or more exemplary aspects of the method 300 of FIG. 6 may allow the electric machine of the hybrid electric propulsion system to assist with providing the desired thrust output while conserving electrical power, preventing damage to the electric machine, etc.

Figure 7:
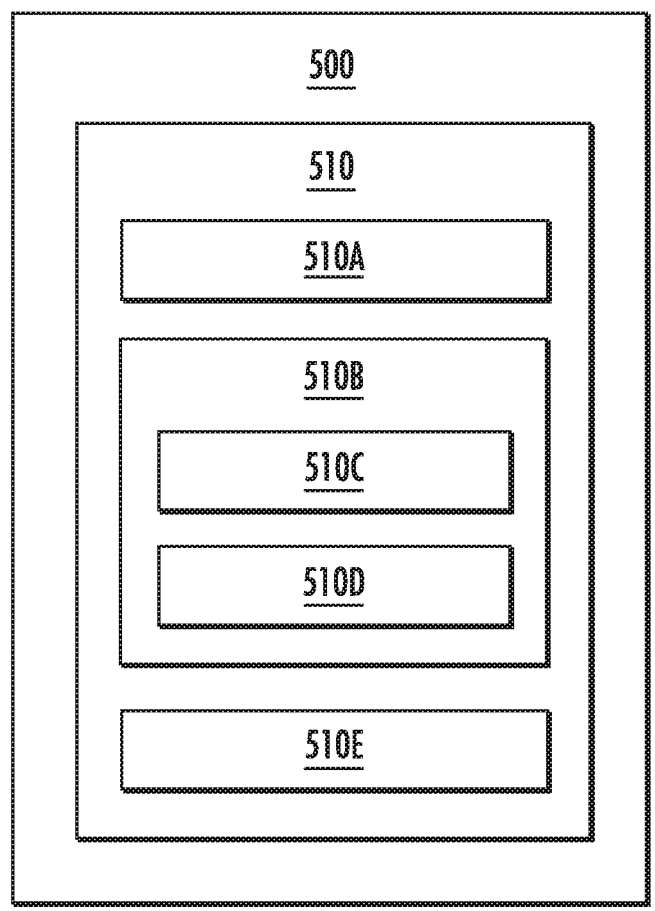
FIG. 7 is a computing system according to example aspects of the present disclosure.

Referring now to FIG. 7, an example computing system 500 according to example embodiments of the present disclosure is depicted. The computing system 500 can be used, for example, as a controller 72 in a hybrid electric propulsion system 50. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for operating a turbomachine (e.g., method 300), as described herein, and/or any other operations or functions of the one or more computing device(s) 510. Accordingly, the method 300 may be computer-implemented methods. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a hybrid electric propulsion system, data indicative of operational parameters of the hybrid electric propulsion system, including of a turbomachine of the hybrid electric propulsion system.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a turbomachine of a hybrid-electric propulsion system of an aircraft, the hybrid-electric propulsion system comprising a turbomachine and an electrical system, the electrical system comprising an electric machine coupled to the turbomachine, the method comprising:

receiving, by one or more computing devices, a command to accelerate the turbomachine to provide a desired thrust output;

receiving, by the one or more computing devices, data indicative of a rate of change of an exhaust gas temperature within the turbomachine approaching or exceeding an upper threshold; and providing electrical power to the electric machine to add power to the turbomachine to provide, or assist with providing, the desired thrust output in response to receiving the command to accelerate the turbomachine and receiving the data indicative of the rate of change of the exhaust gas temperature approaching the upper threshold.

2. The method of claim 1, wherein receiving, by one or more computing devices, the command to accelerate the turbomachine to provide the desired thrust output comprises receiving, by one or more computing devices, the command to accelerate the turbomachine during a pre-cruise flight condition to provide the desired thrust output.

3. The method of claim 2, wherein the pre-cruise flight condition is a takeoff flight condition or a climb flight condition.

4. The method of claim 1, wherein receiving, by the one or more computing devices, data indicative of the rate of change of the exhaust gas temperature approaching the upper threshold comprises determining, by the one or more computing devices, a delta value indicative of how far the rate of change of the exhaust gas temperature is above the upper threshold, and wherein providing electrical power to the electric machine comprises modulating, by the one or more computing devices, an amount of electrical power provided to the electric machine based at least in part on the determined delta value.

5. The method of claim 1, further comprising:
receiving, by the one or more computing devices, data indicative of a turbomachine health parameter, and wherein providing electrical power to the electric machine comprises modulating, by the one or more computing devices, the amount of electrical power provided to the electric machine based at least in part on the received data indicative of the turbomachine health parameter.

6. The method of claim 1, wherein the hybrid electric propulsion system further comprises an electric energy storage unit, and wherein providing electrical power to the electric machine comprises providing electrical power to the electric machine from the electric energy storage unit.

7. The method of claim 1, wherein the hybrid electric propulsion system further comprises an electric energy storage unit, and wherein the method further comprises:
receiving, by the one or more computing devices, data indicative of a charge level of the electric energy storage unit; and
terminating, by the one or more computing devices, the provision of electrical power to the electric machine at least in part in response to receiving, by the one or more computing devices, the data indicative of the charge level of the electric energy storage unit.

8. The method of claim 1, further comprising:
receiving, by the one or more computing devices, data indicative of a temperature of the electric machine; and
terminating, by the one or more computing devices, the provision of electrical power to the electric machine at least in part in response to receiving, by the one or more computing devices, the data indicative of the temperature of the electric machine.

9. The method of claim 1, further comprising:
receiving, by the one or computing devices, data indicative of an operability parameter of the turbomachine; and
terminating, by the one or more computing devices, the provision of electrical power to the electric machine at least in part in response to the received data indicative of the operability parameter of the turbomachine.

10. The method of claim 9, wherein the data indicative of the operability parameter is indicative of at least one of: a speed parameter of one or more components of the turbomachine, a fuel flow to a combustion section of the turbomachine, an internal pressure of the turbomachine, or an internal temperature of the turbomachine.

11. The method of claim 1, wherein receiving, by the one or more computing devices, data indicative of the rate of change of the exhaust gas temperature approaching the upper threshold comprises receiving, by the one or more computing devices, data indicative of an exhaust gas temperature parameter approaching an upper exhaust gas temperature parameter threshold.

12. The method of claim 11, wherein the exhaust gas temperature parameter is indicative of an exhaust gas temperature, and wherein the upper exhaust gas temperature parameter threshold is a predetermined exhaust gas temperature threshold.

13. The method of claim 1, wherein providing electrical power to the electric machine includes providing at least about fifteen horsepower of mechanical power to the turbomachine.

14. A method for operating a turbomachine of a hybrid-electric propulsion system of an aircraft, the hybrid-electric propulsion system comprising a first turbomachine, a second turbomachine, and an electrical system, the electrical system comprising a first electric machine coupled to the first turbomachine, a second electric machine coupled to the second turbomachine, the method comprising:
receiving, by one or more computing devices, a command to accelerate the first turbomachine and the second turbomachine during a takeoff flight condition or a climb flight condition to provide a desired thrust output;
receiving, by the one or more computing devices, data indicative of a temperature parameter approaching or exceeding an upper threshold of the first turbomachine; and
providing electrical power to the first electric machine to add power to the first turbomachine from the second electric machine to provide, or assist with providing, the desired thrust output from the first turbomachine in response to receiving the command to accelerate the turbomachine and receiving the data indicative of the temperature parameter approaching the upper threshold.

15. A method for operating a turbomachine of a hybrid-electric propulsion system of an aircraft, the hybrid-electric propulsion system comprising a turbomachine, a fan separated from the turbomachine, and an electrical system, the electrical system comprising a first electric machine coupled to the turbomachine and a second electric machine coupled to the fan, the method comprising:
receiving, by one or more computing devices, a command to accelerate the turbomachine or the fan to provide a desired thrust output;
receiving, by the one or more computing devices, data indicative of a temperature parameter approaching or exceeding an upper threshold of the turbomachine; and providing electrical power to the second electric machine to add power to the fan to provide, or assist with providing, the desired thrust output by converting electrical power provided thereto into mechanical power for the fan in response to receiving the command to accelerate the turbomachine and receiving the data indicative of the temperature parameter approaching the upper threshold.

16. The method of claim 15, wherein receiving the data indicative of the temperature parameter approaching the upper threshold further comprises receiving data indicative of the temperature parameter being within a predetermined range of a threshold, the range of the threshold being less than the threshold.

\* \* \* \* \*